US011335906B2

(12) United States Patent
Moon et al.

(10) Patent No.: US 11,335,906 B2
(45) Date of Patent: May 17, 2022

(54) NEGATIVE ACTIVE MATERIAL FOR RECHARGEABLE LITHIUM BATTERY, AND RECHARGEABLE LITHIUM BATTERY INCLUDING SAME

(71) Applicant: SAMSUNG SDI CO., LTD., Yongin-si (KR)

(72) Inventors: Joongho Moon, Yongin-si (KR); Eunji Kang, Yongin-si (KR); Yurim Cha, Yongin-si (KR); Soonbong Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 80 days.

(21) Appl. No.: 16/437,803

(22) Filed: Jun. 11, 2019

(65) Prior Publication Data
US 2019/0386297 A1 Dec. 19, 2019

(30) Foreign Application Priority Data

Jun. 15, 2018 (KR) .................. 10-2018-0069124

(51) Int. Cl.
*H01M 4/36* (2006.01)
*H01M 4/583* (2010.01)
(Continued)

(52) U.S. Cl.
CPC ........... *H01M 4/366* (2013.01); *H01M 4/583* (2013.01); *H01M 4/60* (2013.01);
(Continued)

(58) Field of Classification Search
CPC ........... H01M 4/583; H01M 2004/027; H01M 4/1393; H01M 4/62; H01M 4/587;
(Continued)

(56) References Cited

U.S. PATENT DOCUMENTS 4,944,991 A * 7/1990 Karas ..................... H01M 4/66
428/408
6,465,127 B1 10/2002 Shin
(Continued)

FOREIGN PATENT DOCUMENTS

CN 105731551 A 7/2016
KR 10-2000-0056301 A 9/2000
(Continued)

OTHER PUBLICATIONS

Office Action dated Oct. 22, 2021, and accompanying Search Report dated Oct. 13, 2021, of the corresponding Chinese Patent Application No. 201910514481.0, 13pp.

*Primary Examiner* — Eric R Smith
(74) *Attorney, Agent, or Firm* — Lewis Roca Rothgerber Christie LLP

(57) ABSTRACT

A negative active material for a rechargeable lithium battery includes: a core including crystalline carbon; and a metal alkoxide on a surface of the core. A rechargeable lithium battery includes: a negative electrode including a negative active material including a core including crystalline carbon, and a metal alkoxide on a surface of the core; a positive electrode including a positive active material; and an electrolyte.

15 Claims, 6 Drawing Sheets

(51) Int. Cl.
*H01M 10/0525* (2010.01)
*H01M 4/60* (2006.01)
*H01M 4/02* (2006.01)

(52) U.S. Cl.
CPC .. *H01M 10/0525* (2013.01); *H01M 2004/021* (2013.01); *H01M 2004/027* (2013.01)

(58) Field of Classification Search
CPC .. H01M 10/052; H01M 4/133; H01M 4/5835; H01M 4/625; H01M 4/663; H01M 4/9083; H01M 4/926; H01M 4/96; H01M 4/0234; Y02E 60/10
See application file for complete search history.

(56) References Cited

U.S. PATENT DOCUMENTS

| | | | |
|---|---|---|---|
| 2003/0054250 A1* | 3/2003 | Kweon | H01M 4/131 429/231.1 |
| 2003/0096167 A1 | 5/2003 | Park et al. | |
| 2012/0021298 A1* | 1/2012 | Maeda | H01M 4/131 429/304 |
| 2014/0050984 A1* | 2/2014 | Park | H01M 4/587 429/220 |
| 2014/0255770 A1 | 9/2014 | Lee et al. | |
| 2017/0233579 A1* | 8/2017 | Yushin | C01F 5/06 427/212 |
| 2019/0040497 A1* | 2/2019 | Yushin | C22B 5/14 |

FOREIGN PATENT DOCUMENTS

| | | |
|---|---|---|
| KR | 10-2003-0008704 A | 1/2003 |
| KR | 10-2003-0032220 A | 4/2003 |
| KR | 10-2014-0022723 A | 2/2014 |

* cited by examiner

NEGATIVE ACTIVE MATERIAL FOR RECHARGEABLE LITHIUM BATTERY, AND RECHARGEABLE LITHIUM BATTERY INCLUDING SAME

CROSS-REFERENCE TO RELATED APPLICATION

This application claims priority to and the benefit of Korean Patent Application No. 10-2018-0069124 filed in the Korean Intellectual Property Office on Jun. 15, 2018, the entire contents of which are incorporated herein by reference.

BACKGROUND

1. Field

A negative active material for rechargeable lithium battery and a rechargeable lithium battery including the same are disclosed herein.

2. Description of the Related Art

A low voltage system (LVS) is a system of increasing a battery voltage as compared with that of an existing vehicle battery system by exchanging a lead acid battery with a lithium ion battery or equipping a vehicle with a lead acid battery and, additionally, a lithium ion battery.

When an LVS is used, the battery voltage may be increased up to 48 volts (V), as compared to the lead acid battery voltage of the existing vehicle, which is generally 12 V. However, because this battery voltage (e.g., 48 V) is still lower than the general voltage (e.g., about 60V or more) of a lead acid battery for an electric vehicle (EV), such a system is referred to as a low voltage system. As vehicles are being equipped with more electronics, low voltage systems are increasingly being used.

This LVS utilizes fast charge and discharge characteristics (e.g., high power), so that it utilizes a high power negative electrode (in terms of battery charge characteristics relating to the negative electrode). Additionally, reliability regarding high temperature characteristics becomes important.

SUMMARY

An embodiment provides a negative active material for rechargeable lithium battery having excellent electrochemical characteristics and cycle-life characteristics.

Another embodiment provides a rechargeable lithium battery including the negative active material.

An embodiment provides a negative active material for rechargeable lithium battery, the negative active material including: a core including crystalline carbon; and a metal alkoxide on a surface of the core.

In some embodiments, the metal of the metal alkoxide may be Al, Mg, Ti, or a combination thereof.

The metal alkoxide may be a metal methoxide, a metal ethoxide, a metal n-propoxide, a metal isopropoxide, a metal t-butoxide, or a mixture thereof.

The metal alkoxide may be on the surface of the core in a form of a layer or an island.

An amount of the metal alkoxide may be in a range of about 0.03 wt % to about 0.1 wt %, or about 0.03 wt % to about 0.05 wt %, based on 100 wt % of the core.

The metal alkoxide may be a nanoparticle and the metal alkoxide may have an average particle diameter (D50) in a range of about 100 nm to about 500 nm.

Another embodiment of the present disclosure provides a rechargeable lithium battery including: a negative electrode including the negative active material, a positive electrode including a positive active material, and an electrolyte.

According to an embodiment, a method of manufacturing a negative active material for a rechargeable lithium battery includes: mixing crystalline carbon with a metal alkoxide to form a core comprising the crystalline carbon, the core having the metal alkoxide on a surface thereof.

Other embodiments of the present disclosure are included in the following detailed description.

The negative active material for rechargeable lithium battery according to an embodiment may provide a rechargeable lithium battery having excellent electrochemical characteristics and cycle-life characteristics.

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure.

DETAILED DESCRIPTION

Figure 1:
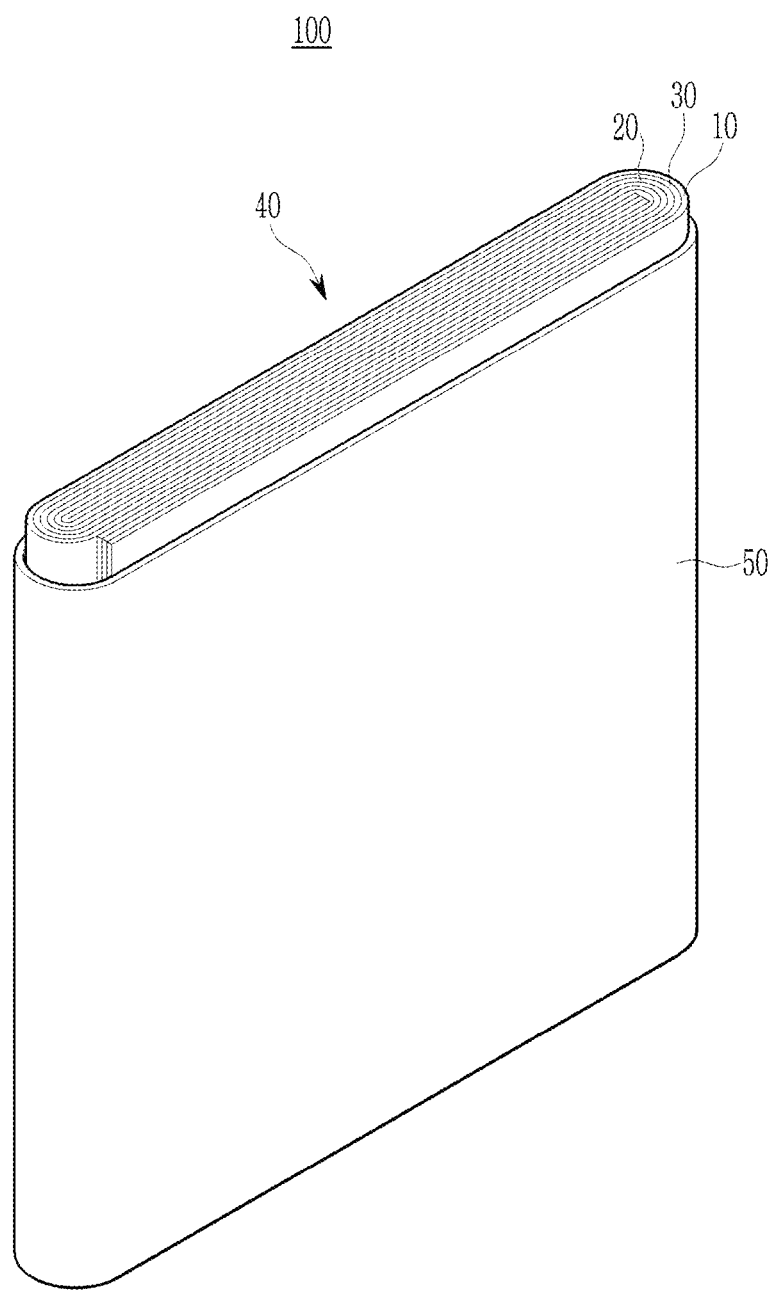
FIG. 1 is a schematic view showing a structure of a rechargeable lithium battery according to an embodiment.

Hereinafter, embodiments of the present disclosure are described in more detail. However, these embodiments are exemplary, the present disclosure is not limited thereto and is instead defined by the scope of the appended claims, and equivalents thereof.

A negative active material for rechargeable lithium battery according to an embodiment includes a core including crystalline carbon and a metal alkoxide on the surface of the core.

In the metal alkoxide, the metal may be Al, Mg, Ti, or a combination thereof. When a metal capable of forming a magnetic (e.g., ferromagnetic) foreign substance such as, for example, Fe, Cr, and Cu is used as the metal in the metal alkoxide, an adverse effect on battery characteristics may result. For example, a short circuit of positive and negative electrodes and/or the like may be inappropriately exerted by (or result from) the magnetic foreign substance formed from the metal.

The metal alkoxide may include a metal methoxide, a metal ethoxide, a metal n-propoxide, a metal isopropoxide, a metal t-butoxide, or a combination thereof (e.g., a mixture thereof). In some embodiments, the metal alkoxide may be a metal isopropoxide. When the metal isopropoxide is used as the metal alkoxide present on the surface of the core, a point contact on the surface is better made or improved, and thus, movement of lithium ions is not almost suppressed or reduced.

In this way, when the metal alkoxide is present on the surface of the core, an electrolyte may be well impregnated into the negative active material, and accordingly, initial discharge resistance may be reduced, and, in addition, high rate capability and cycle-life characteristics may be improved. When a hydroxide or an oxide is present instead of the metal alkoxide, the hydroxide or oxide may work as an insulator, and thus, increase surface resistance. Consequently, the initial discharge resistance of the negative active material including the hydroxide or the oxide on the surface of the core may be increased (relative to the negative active material with or without the metal alkoxide), and in addition, high rate capability and cycle-life characteristics may be deteriorated (e.g., reduced).

The metal alkoxide may be present as a layer-type or an island-type (e.g., as a layer or an island) on the surface of the core. In other words, the metal alkoxide may be present as a continuous layer-type that is continuously present on at least a portion of the surface of the core, or as an incontinuous island-type of being discontinuously present thereon (e.g., as a discontinuous set of discrete islands that do not physically contact one another). In an embodiment, it is important for the metal alkoxide to be present on the surface of the core regardless of the presence type (e.g., as a layer or as a set of islands). In some embodiments, the island-type may improve impregnation of the electrolyte more (relative to the layer-type) as well as further suppress or reduce an ion resistance increase.

The metal alkoxide may be included in an amount of about 0.03 wt % to about 1 wt %, about 0.03 wt % to about 0.1 wt %, or for example, about 0.03 wt % to about 0.05 wt %, based on 100 wt % of the core, regardless of the presence type of the metal alkoxide (e.g., the layer-type or the island-type). When the metal alkoxide is used within the foregoing ranges, an effect of more sufficiently or suitably improving impregnation of the electrolyte may be obtained. When the metal alkoxide is used in an amount of less than about 0.03 wt %, a desired effect may not be obtained, but when the metal alkoxide is used in amount of greater than about 1.0 wt %, capacity may be deteriorated (e.g., reduced).

When the metal alkoxide is present as the layer-type on the surface of crystalline carbon (e.g., the core), the layer has a suitable or desirable thickness for allowing movement of lithium ions. For example, the layer including the metal alkoxide may have a thickness in a range of about 50 nm to about 100 nm. When the metal alkoxide is present as the layer-type, that is, formed into a coating layer having a thickness within the range described herein, the movement of lithium ions may effectively occur without resistance (or substantially without resistance).

The metal alkoxide may be a nanoparticle. Herein, the metal alkoxide has an average particle diameter (D50) of about 100 nm to about 500 nm. As used herein, when a definition is not otherwise provided, an average particle diameter (D50) indicates a particle where a cumulative volume is in a range of about 50 volume % in a particle distribution. When the metal alkoxide has a nanoparticle size as described above such as, for example, an average particle diameter (D50) of about 100 nm to about 500 nm, it may be better adhered to the surface of the core and, in addition, uniformly (e.g., substantially uniformly) on the surface of the core without being used in an excessively large amount.

The crystalline carbon may be natural graphite, artificial graphite, or a combination thereof (e.g., a mixture thereof).

Another embodiment provides a negative electrode including the negative active material. As an example of the negative electrode, the negative electrode includes a negative active material layer including the negative active material and a current collector supporting the negative active material layer.

The negative electrode may be manufactured by mixing the crystalline carbon and the metal alkoxide to prepare the negative active material, mixing the negative active material with a binder and, optionally, a conductive material in a solvent to prepare an active material composition, and then, coating the active material composition on the current collector and drying and compressing the resultant. In addition, a vacuum-drying process may be further performed after the compression process.

In this way, in an embodiment, as the crystalline carbon and the metal alkoxide are mixed first to prepare the negative active material including the crystalline carbon core and the metal alkoxide on the surface of the crystalline carbon core, and the resultant negative active material is used to prepare the active material composition, an effect of using the metal alkoxide may be well obtained.

However, when the metal alkoxide is added during preparation of the negative active material composition (e.g., when the metal alkoxide is mixed along with the crystalline carbon, the binder, and optionally, the conductive material in the solvent), dispersibility of the metal alkoxide in the solvent, for example, when the metal alkoxide has a nano-size, is very deteriorated (e.g., reduced), and accordingly, the effect of using the metal alkoxide may not be obtained.

The metal alkoxide may have a nano-size such as, for example, an average particle diameter (D50) in a range of about 100 nm to about 500 nm.

The mixing process of the crystalline carbon and the metal alkoxide may be a wet process of using a solvent or a dry process of using no solvent. The solvent used for the wet process may be ethanol, isopropanol, or a combination thereof (e.g., a mixture thereof).

When the wet process is adopted for the mixing process, the metal alkoxide may be easily present as the layer-type on the surface of the crystalline carbon, and when the dry process is adopted, the metal alkoxide may be easily present as the island-type thereon.

The coating process may be performed at room temperature (e.g., at a temperature in a range of about 20° C. to about 25° C.), and the drying process may be performed at a temperature in a range of about 115° C. to about 125° C. In addition, when the vacuum-drying process is further performed, the vacuum-drying process may be performed at a temperature in a range of about 135° C. to about 145° C. In this way, when the coating process and the vacuum-drying process are performed within the foregoing temperature ranges, the metal alkoxide may be maintained even in a final product of the negative electrode. When the drying process is performed at a temperature of greater than about 125° C., or when the vacuum-drying process is performed at a temperature of greater than about 145° C., the metal alkoxide may be unsuitably or inappropriately converted into a metal hydroxide.

The compression process may be performed at room temperature (e.g., at a temperature in a range of about 20° C. to about 25° C.).

In the negative active material layer, the negative active material may be included in an amount in a range of about 95 wt % to about 99 wt %, based on the total weight of the negative active material layer.

In the negative active material layer, an amount of the binder may be in a range of about 1 wt % to about 5 wt %, based on a total weight of the negative active material layer. When it further includes the conductive material, it may include about 90 wt % to about 98 wt % of the negative active material, about 1 wt % to about 5 wt % of the binder, and about 1 wt % to about 5 wt % of the conductive material.

The binder improves binding properties of negative active material particles with one another and with a current collector. The binder may include a non-aqueous binder, an aqueous binder, or a combination thereof.

The non-aqueous binder may include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof (e.g., a mixture thereof).

The aqueous binder include a styrene-butadiene rubber, an acrylated styrene-butadiene rubber (SBR), an acrylonitrile-butadiene rubber, an acrylic rubber, a butyl rubber, an ethylene propylene copolymer, polyepichlorohydrine, polyphosphazene, polyacrylonitrile, polystyrene, an ethylene propylene diene copolymer, polyvinylpyridine, chlorosulfonated polyethylene, latex, a polyester resin, an acrylic resin, a phenolic resin, an epoxy resin, polyvinyl alcohol, or a combination thereof (e.g., a mixture thereof).

When the aqueous binder is used as the binder for the negative electrode, a cellulose-based compound may be further used to provide viscosity as a thickener. The cellulose-based compound includes one or more of carboxylmethyl cellulose, hydroxypropylmethyl cellulose, methyl cellulose, or alkali metal salts thereof. The alkali metal may be Na, K, or Li. Such a thickener may be included in an amount in a range of about 0.1 parts by weight to about 3 parts by weight based on 100 parts by weight of the negative active material.

The conductive material is included to provide electrical conductivity. Any suitable electrically conductive material may be used as a conductive material unless it causes a chemical change (e.g., causes an undesirable chemical change of one or more components of the rechargeable lithium battery). Examples of the conductive material include a carbon-based material such as natural graphite, artificial graphite, carbon black, acetylene black, ketjen black, a carbon fiber and/or the like; a metal-based material of a metal powder or a metal fiber including copper, nickel, aluminum, silver, and/or the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The negative electrode may have active mass density in a range of about 1.60 g/cc to about 1.70 g/cc, and according to an embodiment, from about 1.62 g/cc to about 1.66 g/cc. Herein, the active mass indicates the negative active material layer including the negative active material, the binder, and, optionally, the conductive material. When the negative electrode has active mass density within the foregoing range, the active mass density is high, and accordingly, high energy density and high capacity may be obtained. In addition, the negative active material according to an embodiment has excellent impregnation of an electrolyte, and thus, may provide a negative electrode having this high active mass density.

An embodiment provides a rechargeable lithium battery including the negative electrode, a positive electrode including a positive active material, and an electrolyte.

The positive electrode may include a positive current collector and a positive active material layer formed on the positive current collector. The positive active material may include lithiated intercalation compounds that reversibly intercalate and deintercalate lithium ions. For example, it may include one or more composite oxides of a metal selected from cobalt, manganese, nickel, and a combination thereof, and lithium. Additional examples may include compounds represented by one of the following chemical formulae. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}O_2(PO_4)_3$ ($0 \leq f \leq 2$); $Li_{3-f}Fe_2(PO_4)_3$ ($0 \leq f \leq 2$); $Li_aFePO_4$ ($0.90 \leq a \leq 1.8$)

In the chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from an oxide of the coating element, a hydroxide of the coating element, an oxyhydroxide of the coating element, an oxycarbonate of the coating element, and a hydroxyl carbonate of the coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be formed utilizing a method having no (or substantially no) adverse influence on properties of a positive active material by using these elements in the compound. For example, the method may include any suitable coating method such as spray coating, dipping, and the like, and should be readily recognizable to one of ordinary skill in the art upon review of the present disclosure.

In the positive electrode, an amount of the positive active material may be 90 wt % to 98 wt % based on the total weight of the positive active material layer.

In an embodiment of the present disclosure, the positive active material layer may further include a binder and a conductive material. Herein, each amount of the binder and the conductive material may be about 1 wt % to about 5 wt %, respectively based on a total amount of the positive active material layer.

The binder improves binding properties of positive active material particles with one another and with a current collector. Examples of the binder may include polyvinyl alcohol, carboxymethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrical conductivity. Any suitable electrically conductive material may be used as a conductive material unless it causes a chemical change in a battery (e.g., causes an undesirable chemical change of one or more components of the rechargeable lithium battery). Examples of the conductive material include a carbon-based material such as natural graphite, artificial graphite, carbon black, acetylene black, ketjen black, a carbon fiber and/or the like; a metal-based material of a metal powder or a metal fiber including copper, nickel, aluminum, silver, and/or the like; a conductive polymer such as a polyphenylene derivative; or a mixture thereof.

The current collector may include Al, but is not limited thereto.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, and/or aprotic solvent.

The carbonate based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, dimethylacetate, methylpropionate, ethylpropionate, decanolide, mevalonolactone, caprolactone, and/or the like. The ether-based solvent may include dibutyl ether, tetraglyme, diglyme, dimethoxyethane, 2-methyltetrahydrofuran, tetrahydrofuran, and/or the like. The ketone-based solvent may include cyclohexanone and/or the like. The alcohol-based solvent may include ethyl alcohol, isopropyl alcohol, and/or the like, and examples of the aprotic solvent include nitriles such as R—CN (where R is a C2 to C20 linear, branched, or cyclic hydrocarbon group, or may include a double bond, an aromatic ring, or an ether bond), amides such as dimethylformamide, dioxolanes such as 1,3-dioxolane, sulfolanes, and/or the like.

The organic solvent may be used alone or in a mixture. When the organic solvent is used in a mixture, the mixture ratio may be controlled in accordance with a suitable or desirable battery performance, which may be understood by a person having an ordinary skill in this art upon reviewing the present disclosure.

The carbonate-based solvent is prepared by mixing a cyclic carbonate and a chain carbonate. When the cyclic carbonate and chain carbonate are mixed together to a volume ratio of about 1:1 to about 1:9, an electrolyte performance may be improved.

The organic solvent may further include an aromatic hydrocarbon-based organic solvent in addition to the carbonate-based solvent. Herein, the carbonate-based solvent and the aromatic hydrocarbon-based organic solvent may be mixed to a volume ratio of about 1:1 to about 30:1.

The aromatic hydrocarbon-based organic solvent may be an aromatic hydrocarbon-based compound of Chemical Formula 1.

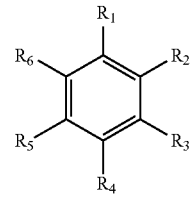

Chemical Formula 1

In Chemical Formula 1, $R_1$ to $R_6$ are the same or different and are selected from hydrogen, a halogen, a C1 to C10 alkyl group, a haloalkyl group, and a combination thereof.

Examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof (e.g., a mixture thereof).

The electrolyte may further include vinylene carbonate or an ethylene carbonate-based compound represented by Chemical Formula 2 as an additive for improving the cycle-life of a battery.

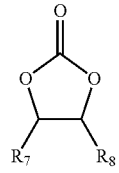

Chemical Formula 2

In Chemical Formula 2, $R_7$ and $R_8$ are the same or different and selected from hydrogen, a halogen, a cyano group (CN), a nitro group ($NO_2$), and a fluorinated C1 to C5 alkyl group, provided that at least one of $R_7$ and $R_8$ is a halogen, a cyano group (CN), a nitro group ($NO_2$), and a fluorinated C1 to C5 alkyl group and both of $R_7$ and $R_8$ are not hydrogen.

Examples of the ethylene carbonate-based compound may include difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving the cycle-life may be used within an appropriate or suitable range.

The lithium salt dissolved in the organic solvent supplies lithium ions in a battery, enables a basic operation of a rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_6)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers, for example, an integer in a range of 1 to 20), LiCl, LiI and $LiB(C_2O_4)_2$ (lithium bis(oxalato) borate; LiBOB). The lithium salt may be used at a concentration in a range of about 0.1 M to about 2.0 M. When the lithium salt is included at the above concentration range, an electrolyte may have excellent performance and lithium ion mobility due to optimal electrolyte conductivity and viscosity.

The rechargeable lithium battery may further include a separator between the negative electrode and the positive electrode, depending on a type of the battery. Examples of a suitable separator material include polyethylene, polypropylene, polyvinylidene fluoride, and multi-layers thereof having two or more layers and may be a mixed multilayer such as a polyethylene/polypropylene double-layered separator, a polyethylene/polypropylene/polyethylene triple-layered separator, and a polypropylene/polyethylene/polypropylene triple-layered separator.

FIG. 1 is an exploded perspective view showing a rechargeable lithium battery according to an embodiment. The rechargeable lithium battery according to an embodiment is illustrated as a prismatic battery but is not limited thereto and may include variously-shaped batteries such as a cylindrical battery, a pouch battery, and/or the like.

Referring to FIG. 1, a rechargeable lithium battery 100 according to an embodiment includes an electrode assembly 40 manufactured by winding a separator 30 between a positive electrode 10 and a negative electrode 20, and a case 50 housing the electrode assembly 40. An electrolyte may be impregnated in the positive electrode 10, the negative electrode 20, and the separator 30.

Hereinafter, examples of the present disclosure and comparative examples are described. These examples, however, are not in any sense to be interpreted as limiting the scope of the present disclosure.

Example 1

Artificial graphite and aluminum isopropoxide having an average particle diameter (D50) of 500 nm were dry-mixed to prepare a negative active material having the aluminum isopropoxide as an island-type on the surface of the artificial graphite. Herein, the aluminum isopropoxide was used in an amount of 0.05 wt %, based on 100 wt % of the artificial graphite.

97.5 wt % of the negative active material, 1 wt % of carboxymethyl cellulose, and 1.5 wt % of a styrene-butadiene rubber were mixed in a water solvent to prepare a negative active material slurry composition. The negative active material slurry composition was coated on a Cu current collector at room temperature (25° C.), dried at 120° C., compressed at room temperature (25° C.), and slit. Subsequently, the slit product was vacuum-dried at 145° C. to manufacture a negative electrode having active mass density of 1.65 g/cc.

* TGA (Thermogravimetric Analysis) Graph

Figure 2:
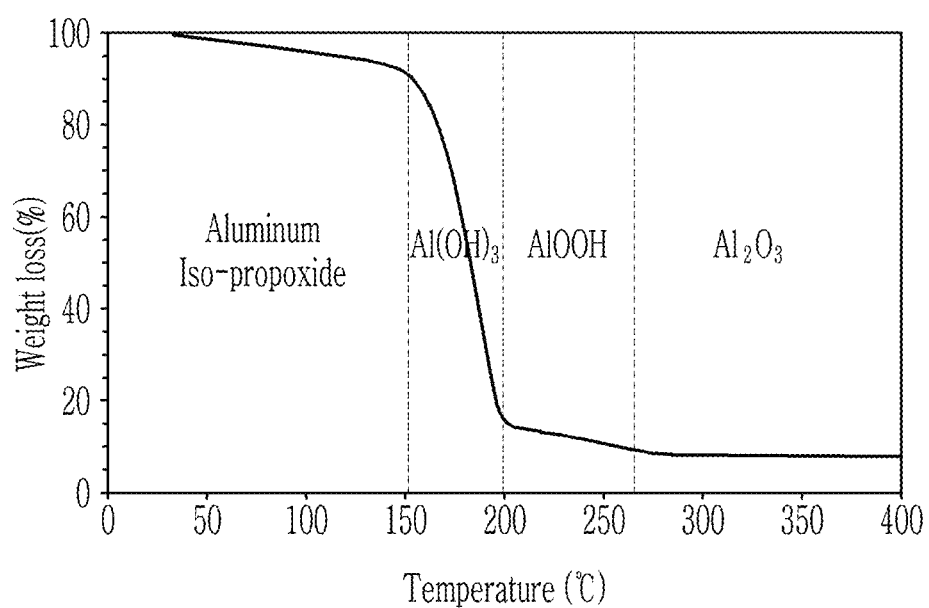
FIG. 2 is a TGA graph showing an aluminum isopropoxide used in Example 1.

The aluminum isopropoxide used in Example 1 was heat-treated up to 400° C., and a thermogravimetric decrease curve of the aluminum isopropoxide was measured. The result is shown in FIG. 2. As shown in FIG. 2, when the aluminum isopropoxide was heat-treated at less than or equal to 150° C., the aluminum isopropoxide was not thermally decomposed but maintained. Referring to this result, when an aluminum isopropoxide is used to form a negative active material layer and then, dried and vacuum-dried at 145° C., the aluminum isopropoxide may be expected to be present in the final negative active material layer.

Example 2

A negative electrode having active mass density of 1.62 g/cc was manufactured according to substantially the same method as Example 1 except that the aluminum isopropoxide was used in an amount of 0.03 wt % based on 100 wt % of the artificial graphite.

Example 3

A negative electrode having active mass density of 1.62 g/cc was manufactured according to substantially the same method as Example 1 except that the amount of the aluminum isopropoxide was changed into 0.05 wt % based on 100 wt % of the artificial graphite.

Example 4

A negative electrode having active mass density of 1.62 g/cc was manufactured according to substantially the same method as Example 1 except that magnesium isopropoxide having an average particle diameter (D50) of 500 nm was used instead of the aluminum isopropoxide.

Example 5

A negative electrode having active mass density of 1.62 g/cc was manufactured according to substantially the same method as Example 1 except that titanium isopropoxide having an average particle diameter (D50) of 500 nm was used instead of the aluminum isopropoxide.

Comparative Example 1

A negative electrode having active mass density of 1.61 g/cc was manufactured according to substantially the same method as Example 1 except that artificial graphite alone was used as a negative active material.

Comparative Example 2

A negative electrode having active mass density of 1.60 g/cc was manufactured according to substantially the same method as Example 1 except that $Al(OH)_3$ having an average particle diameter (D50) of 500 nm was used instead of the aluminum isopropoxide.

Comparative Example 3

A negative electrode having active mass density of 1.60 g/cc was manufactured according to substantially the same method as Example 1 except that $Al_2O_3$ having an average particle diameter (D50) of 500 nm was used instead of the aluminum isopropoxide.

Evaluation Example 1: SEM Image

Figure 3A:
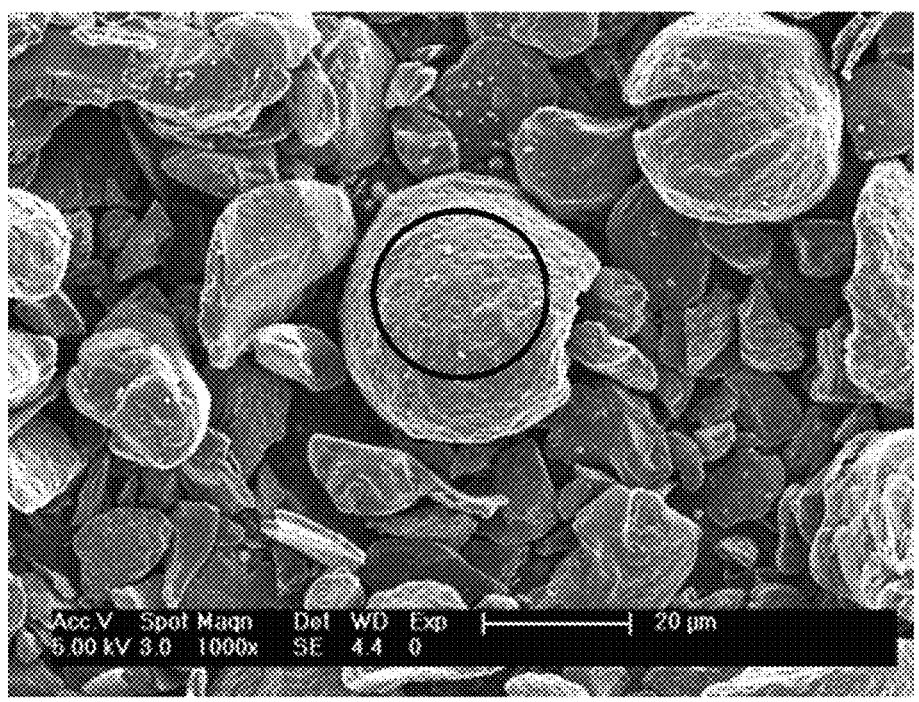
FIG. 3A is a 1,000 times magnified SEM image showing the surface of a negative active material of Example 1.
Figure 3B:
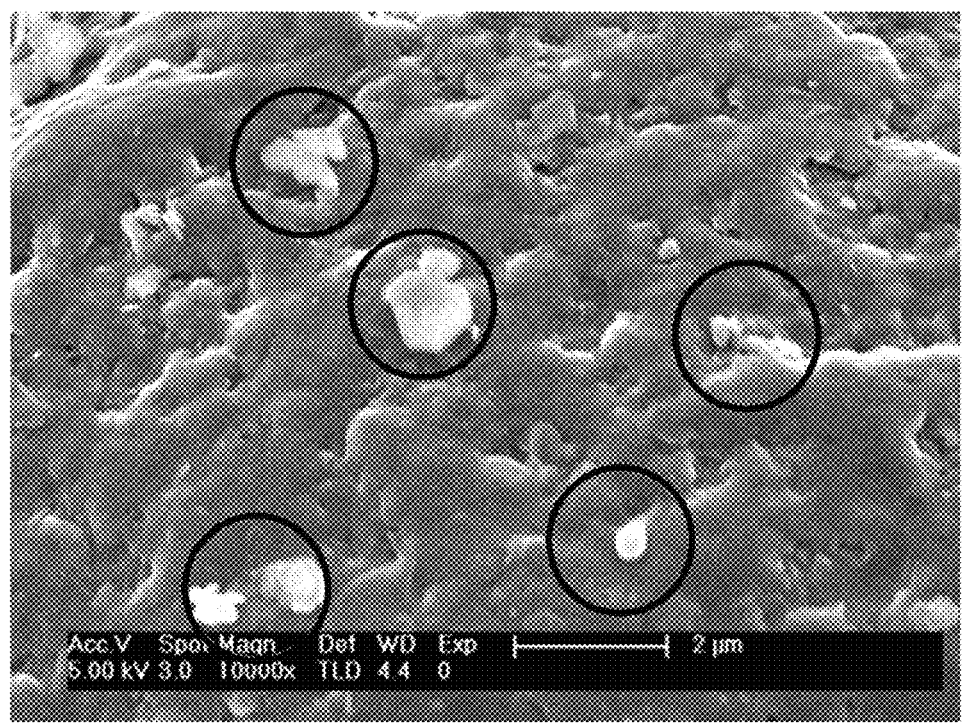
FIG. 3B is a 10,000 times magnified SEM image showing an enlarged view of a portion of the SEM image of FIG. 3A.

A 1,000 times magnified scanning electron microscope (SEM) image of the surface of the negative active material according to Example 1 is shown in FIG. 3A, and a 10,000 times magnified SEM image showing an enlarged view of a portion of the surface in FIG. 3A is shown in FIG. 3B. In FIGS. 3A and 3B, a bright white portion corresponds with the aluminum isopropoxide. As can be seen in FIGS. 3A and 3B, the aluminum isopropoxide having an average particle diameter (D50) of about 500 nm was clearly present on the surface of the artificial graphite.

Manufacture of Half-Cell

The negative electrodes according to Examples 1 to 5 and Comparative Examples 1 to 4 were respectively used along with a lithium metal and an electrolyte to manufacture each half-cell. The electrolyte was prepared by dissolving 1M $LiPF_6$ in a mixed solvent of ethylene carbonate and dimethyl carbonate (a volume ratio of 3:7).

Evaluation Example 2: Charge Characteristics

Figure 4:
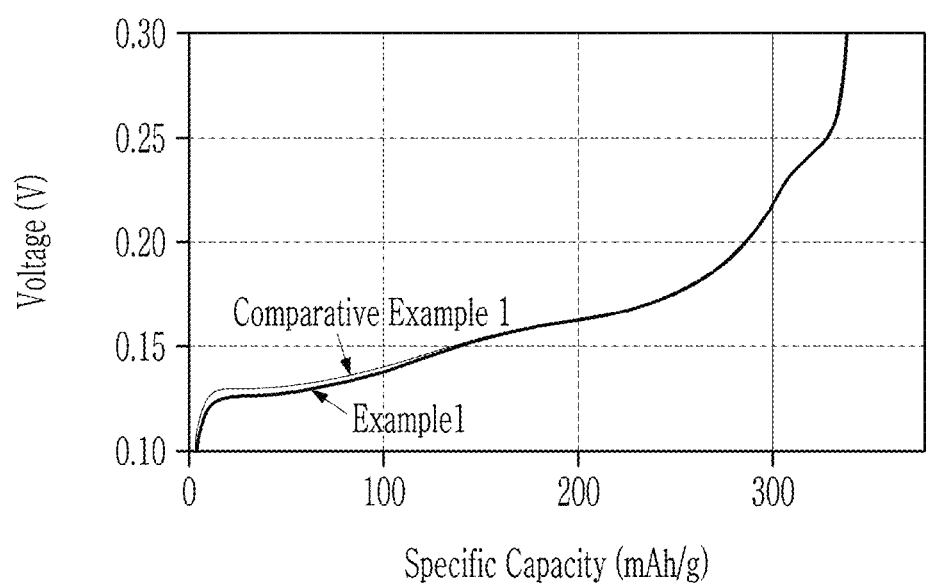
FIG. 4 is a graph showing charge characteristics of half-cells respectively using negative electrodes of Example 1 and Comparative Example 1.

The manufactured half-cells were once charged and discharged at 1 C, and the results for Example 1 and Comparative Example 1 are shown in FIG. 4. As shown in FIG. 4, an initial discharge voltage of Example 1 was lower than that of Comparative Example 1, and accordingly, resistance turned out to be reduced.

Figure 5:
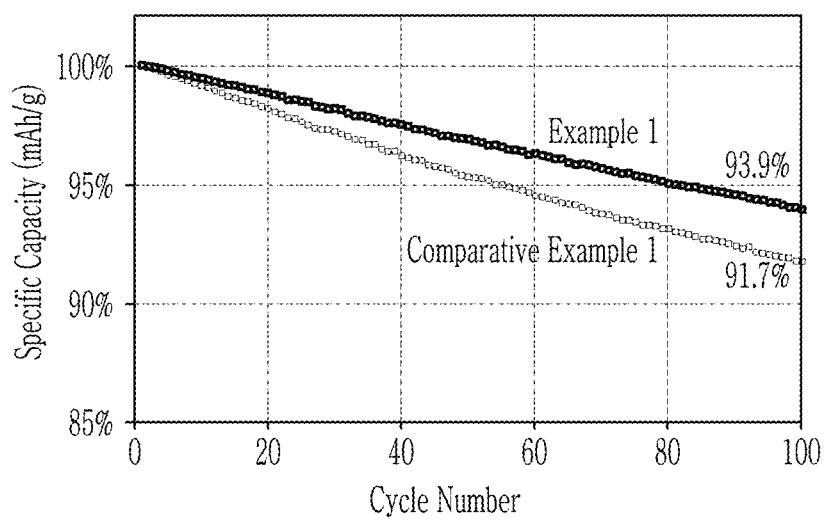
FIG. 5 is a graph showing cycle-life characteristics of the half-cells respectively using the negative electrodes of Example 1 and Comparative Example 1.

In addition, the half-cells were 100 times charged and discharged at 1 C, each discharge capacity rate of the $100^{th}$ discharge capacity relative to the $1^{st}$ discharge capacity was calculated, and the results for Example 1 and Comparative Example 1 are shown in FIG. 5.

As shown in FIG. 5, a capacity retention, that is, cycle-life characteristics, of the half-cell using the negative electrode of Example 1 were higher than that of the half-cell using the negative electrode of Comparative Example 1.

Evaluation Example 3: Initial Efficiency and High-Rate Charge and Discharge Characteristics Each half-cell was manufactured by using the negative electrodes of Example 1 and the Comparative Example 1, respectively, a lithium metal counter electrode, and an electrolyte. The electrolyte was prepared by dissolving 1M $LiPF_6$ in a mixed solvent of ethylene carbonate and dimethyl carbonate (a volume ratio of 3:7).

Each half-cell was once charged and discharged for formation at 0.1 C, and formation charge and discharge capacity thereof was measured. Among the results, the formation discharge capacity and initial efficiency calculated therefrom are shown in Table 1.

After the formation charge and discharge, each half-cell was once charged and discharged at 0.2 C, 0.2 C discharge capacity was measured, and then, the result as a standard capacity is shown in Table 1.

After the formation charge and discharge, each of the half-cells was charged and discharged once at 2 C and once 2 C, and then, a 2 C charge rate of 2 C charge capacity relative to the formation charge capacity and a 2 C discharge rate of 2 C discharge capacity relative to the formation discharge capacity are calculated and shown in Table 1. The negative electrodes of Comparative Example 1 to 3 were respectively used along with a lithium metal counter electrode and an electrolyte to manufacture each half-cell. The electrolyte was prepared by dissolving 1M $LiPF_6$ in a mixed solvent of ethylene carbonate and dimethyl carbonate (a volume ratio of 3:7).

The half-cell was once charged and discharged for formation at 0.1 C to measure formation discharge capacity. Among the results, the formation discharge capacity and initial efficiency calculated therefrom were obtained, and the results are shown in Table 2.

After the formation charge and discharge, the half-cell was once charged and discharged at 0.2 C to measure 0.2 C discharge capacity, and the result is shown as a standard capacity in Table 2.

After the formation charge and discharge, the cell was once charged and discharged at 2 C, and then, a 2 C charge capacity rate of the 2 C charge capacity relative to the formation charge capacity and a 2 C discharge capacity rate of the 2 C discharge capacity relative to the formation discharge capacity are calculated and shown in Table 2.

TABLE 1

| | Formation discharge capacity (mAh/g) | Initial efficiency (%) | Standard capacity (mAh/g) | 2 C charge rate (%) | 2 C discharge rate (%) |
|---|---|---|---|---|---|
| Comparative Example 1 | 347.9 | 93.5 | 346.6 | 39 | 97.2 |
| Example 1 | 346.1 | 93.5 | 345.3 | 42 | 98.0 |

TABLE 2

| | Formation discharge capacity (mAh/g) | Initial efficiency (%) | Standard capacity (mAh/g) | 2 C charge rate (%) | 2 C discharge rate (%) |
|---|---|---|---|---|---|
| Comparative Example 1 | 356.7 | 94.8 | 355.7 | 36 | 96.8 |
| Comparative Example 2 | 351.2 | 95.1 | 349.9 | 36 | 97.4 |
| Comparative Example 3 | 353.5 | 95.4 | 352.1 | 36 | 97.0 |

As shown in Table 1, the half-cell using the negative electrode of Example 1 including a negative active material having aluminum isopropoxide on the surface showed excellent 2 C charge rate and 2 C discharge rate as compared with those of Comparative Example 1. On the contrary, the half-cells using the negative electrodes of Comparative Examples 2 and 3 having aluminum hydroxide or aluminum oxide on the surface showed the same 2 C charge rate to the half-cell using the negative electrode of Comparative Example 1 including artificial graphite as a negative active material and a similar 2 C discharge rate as compared with the half-cell using the negative electrode of Comparative Example 1. Thus, these results show an isopropoxide produces unexpected effects compared to a hydroxide or an oxide coating.

Referring to the results herein, when aluminum isopropoxide is on the surface of artificial graphite, high-rate charge and discharge characteristics are improved, but when aluminum hydroxide or aluminum oxide is thereon, high-rate charge and discharge characteristics are rather deteriorated (reduced).

Evaluation Example 4: Cycle-life Characteristics

The manufactured half-cells were 100 times charged and discharged at 1 C. Among discharge capacity rates of $100^{th}$ discharge capacity relative to $1^{st}$ discharge capacity, the results of Example 1 and Comparative Example 1 are shown in FIG. 5. As shown in FIG. 5, Example 1 exhibited excellent capacity retention as compared with Comparative Example 1.

In addition, the results of Examples 2 to 5 and Comparative Examples 2 to 3 are shown in Table 3.

TABLE 3

|  | Capacity Retention (%) |
| --- | --- |
| Example 2 | 93.5 |
| Example 3 | 94.1 |
| Example 4 | 94.0 |
| Example 5 | 93.7 |
| Comparative Example 2 | 92.0 |
| Comparative Example 3 | 92.3 |

As shown in Table 3, the cells of Examples 2 to 5 showed excellent capacity retention as compared with Comparative Examples 2 to 3.

In the drawings, the relative sizes of elements, layers, and regions may be exaggerated for clarity. It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While the subject matter of the present disclosure has been described in connection with what are presently considered to be practical example embodiments, it is to be understood that the present disclosure is not limited to the disclosed embodiments. On the contrary, it is intended to cover various modifications and equivalent arrangements included within the spirit and scope of the appended claims, and equivalents thereof.

What is claimed is:

1. A negative active material for a rechargeable lithium battery, the negative active material comprising:
   a core comprising crystalline carbon; and
   a coating consisting of metal alkoxide on a surface of the core,
   wherein the metal alkoxide is in the form of nanoparticles, and
   wherein the metal alkoxide has an average particle diameter (D50) in a range of about 100 nm to about 500 nm.

2. The negative active material of claim 1, wherein the metal of the metal alkoxide is Al, Mg, Ti, or a combination thereof.

3. The negative active material of claim 1, wherein the metal alkoxide is a metal methoxide, a metal ethoxide, a metal n-propoxide, a metal isopropoxide, a metal t-butoxide, or a mixture thereof.

4. The negative active material of claim 1, wherein the metal alkoxide is on the surface of the core in a form of a layer or an island.

5. The negative active material of claim 1, wherein an amount of the metal alkoxide is in a range of about 0.03 wt % to about 0.1 wt %, based on 100 wt % of the core.

6. The negative active material of claim 1, wherein an amount of the metal alkoxide is in a range of about 0.03 wt % to about 0.05 wt %, based on 100 wt % of the core.

7. A method of manufacturing a negative active material for a rechargeable lithium battery, the method comprising:
mixing crystalline carbon with a metal alkoxide to form a core comprising the crystalline carbon, the core having the metal alkoxide on a surface thereof wherein the metal alkoxide is in the form of nanoparticles, and wherein the metal alkoxide has an average particle diameter (D50) in a range of about 100 nm to about 500 nm—after "on a surface thereof".

8. The method of claim 7, wherein the mixing comprises dry mixing the crystalline carbon with the metal alkoxide to form islands of the metal alkoxide on the surface of the core.

9. The method of claim 7, wherein the mixing comprises wet mixing the crystalline carbon with the metal alkoxide together with a solvent to form a layer of the metal alkoxide on the surface of the core.

10. The method of claim 9, wherein the solvent comprises ethanol, isopropanol, or a mixture thereof.

11. The method of claim 7, wherein the metal of the metal alkoxide is Al, Mg, Ti, or a combination thereof.

12. The method of claim 7, wherein the metal alkoxide is a metal methoxide, a metal ethoxide, a metal n-propoxide, a metal isopropoxide, a metal t-butoxide, or a mixture thereof.

13. The method of claim 7, wherein the metal alkoxide is on the surface of the core in a form of a layer or an island.

14. The method of claim 7, wherein an amount of the metal alkoxide is in a range of about 0.03 wt % to about 0.1 wt %, based on 100 wt % of the core.

15. The method of claim 7, wherein an amount of the metal alkoxide is in a range of about 0.03 wt % to about 0.05 wt %, based on 100 wt % of the core.

* * * * *